(12) United States Patent
Rocca et al.

(10) Patent No.: US 6,456,206 B1
(45) Date of Patent: Sep. 24, 2002

(54) INCLEMENT WEATHER SAFETY SYSTEM

(75) Inventors: Richard M. Rocca, 1116 Beverly Rd., Brooklyn, NY (US) 11218; Irving Jacobson, Wappingers Falls, NY (US)

(73) Assignee: Richard M. Rocca, Brooklyn, NY (US)

( * ) Notice: Subject to any disclaimer, the term of this patent is extended or adjusted under 35 U.S.C. 154(b) by 1499 days.

(21) Appl. No.: 08/730,236

(22) Filed: Oct. 21, 1996

Related U.S. Application Data (63) Continuation-in-part of application No. 08/304,567, filed on Sep. 12, 1994, now abandoned.

(51) Int. Cl.[7] .................................................. B60Q 1/34
(52) U.S. Cl. ........................ 340/975; 307/10.8; 340/471
(58) Field of Search ................................ 340/468, 469, 340/471, 475, 463, 465, 438, 439, 901, 905, 425.5; 315/80, 82; 307/10.8; 362/61

(56) References Cited

U.S. PATENT DOCUMENTS

| 2,655,642 | A | * | 10/1953 | Ayres et al. | 340/471 |
| 3,316,441 | A | * | 4/1967 | Nallinger | 340/469 |
| 3,553,644 | A | * | 1/1971 | Elmer | 340/471 |
| 3,631,391 | A | * | 12/1971 | Eckhardt | 340/471 |
| 5,231,373 | A | * | 7/1993 | Freeman et al. | 340/467 |

* cited by examiner

*Primary Examiner*—Brent A. Swarthout
(74) *Attorney, Agent, or Firm*—Joseph B. Taphorn (57) ABSTRACT

The present invention relates to a inclement weather safety system where the purpose of the system is to allow other drivers in your vicinity to see your vehicle at a further distance away, when there is very severe weather conditions by strobing the head lights or fog lights or strobe lights at microsecond speed and/or increasing the illumination of various secondary lights of the motor vehicle.

20 Claims, 4 Drawing Sheets

FIG. 4 understand# INCLEMENT WEATHER SAFETY SYSTEM

This is a continuation-in-part of our patent application Ser. No. 8/304,567 filed Sep. 12, 1994 for "Inclement Weather Safety System" and now abandoned.

BACKGROUND OF THE INVENTION

1. Field of the Invention

The present invention relates to an inclement weather safety system, wherein the various lights on a vehicle will strobe and vary intensity depending on the weather conditions.

This invention is suitable for any vehicle that is used during inclement weather.

The present invention is directed to allowing other drivers in your vicinity to see your vehicle at a further distance away, where there is very severe inclement weather conditions.

2. Description of the Prior Art

The turning on of the headlights of a vehicle during poor visibility conditions is a safety measure. In some states the law requires that when the windshield wipers are turned on, such as during rain conditions, the headlights must also be turned on. Operation of the vehicle exterior lights not only enhances visibility by the vehicle operator, but also enhances visibility of the vehicle to third parties.

Previously, there have been inventions that are in vehicles that automatically switch on hazard lights of a motor vehicle if the vehicle falls below a prescribes threshold speed or when the closure speed or distance between the motor vehicle and another motor vehicle drops below prescribed values.

Other inventions turn on the vehicles headlights when the windshield wipers are turned on. For example, in U.S. Pat No. 4,656,363, to Carter et al. and Rosenblum U.S. Pat. No. 4,236,099. The U.S. Pat. No. 3,500,120 to Schultz, U.S. Pat. No. 3,519,837 to Nolin, U.S. Pat. No. 3,591,845 to Vanderpoel, and U.S. Pat. No. 3,600,596 to Aloisantoni all disclose similar or related systems. The U.S. Pat No. 3,769,519 to Adamian discloses an automatic control for the headlights responsive to ambient light levels.

There have also been inventions in the prior art that vary the blink rate of the brake lights of a vehicle in proportion with the degree of hazard sensed according to change in deceleration such as in U.S. Pat. No. 4,357,594. Freeman et al U.S. Pat. No. 4,321,013 of Freeman teaches the concept of controlling the duty cycle of a pulse-form signal provided for energization of vehicle brake lights for purposes of controlling brake light intensity in stepwise manner as a function of brake pressure.

Numerous innovations for inclement weather safety systems have been provided in the prior art that are described as follows. Even though these innovations may be suitable for the specific individual purposes to which they address, they differ from the present invention as hereinafter contrasted.

In U.S. Pat. No. 5,231,373, titled Multi-level Illumination Control System for Automotive Signaling, invented by William H. Freeman, John H. Scandrett And John R. Durbin a vehicular borne illumination control system of the invention for vehicular use automatically controls intensity of a signal light source, i.e., center mounted brake signal, as a function of one or more safety-affecting parameters, e.g., deceleration and/or light level or other ambient condition including fog or precipitation as sensed by sensor(s) of the system. MOSFET switching controls energization of the light from vehicle power, with capability of providing different possible illumination levels by duty cycle control. A microcontroller is responsive sensor input for controlling the duty cycle to vary energization of the light source for transition between said different illumination levels. The transition is thus able to be varied according to a time-varying function, as effectively by spiked overdriving or underdriving, to compensate for human physiological inability to perceive change in the different intensity levels or states. This invention varies the intensity of the brake light depending upon various inputs into the sensors.

It has nothing to do with the climate that the vehicle is traveling in or increase illumination of the vehicle's lighting systems.

In U.S. Pat. No. 5,231,331, titled Automatic Vehicle Headlight/taillight Control, invented by Jack B. Meister, an apparatus for operating exterior lights on an automotive vehicle under inclement weather conditions that includes an electronic switch responsive to a vehicle operator for selectively activation the vehicle windshield wipers under inclement weather conditions. and electronic circuitry responsive to the windshield wiper switch for automatically applying electrical power to the vehicle exterior lights. The electronic circuitry preferably comprises a latch circuit that is set by operator activation of the vehicle windshield wipers for maintaining illumination of the vehicle exterior lights even if the windshield wipers are later deactivated by the operator. The latch circuit is reset by operation of the vehicle ignition switch to disenable ignition at the vehicle engine. Thus, the vehicle exterior lights are activated. and remain activated under inclement weather conditions that require operation of the windshield wipers. This invention turns on the exterior lights of a vehicle when inclement weather is detected whereas the present invention will strobe or vary the illumination of the various lighting systems of the vehicle to warn other vehicles and aid them in detection of the illuminated vehicle.

In U.S. Pat. No. 5,185,558, titled Vehicle Light, Windshield Wiper Control System, invented by Charles E. Benedict and Donald M. Stumpf, a vehicle's input switches relating to ignition, lights and moisture or rain provide responsive inputs that feed through a digital logic circuit to outputs of an electronic switching device for automatically activating the vehicle's lights and wipers. An alarm may be activated if certain input switches are turned on when the ignition is off. The digital logic circuit may be discrete, a programmable read only memory (PROM) or a programmable logic array (PLA). The electronic switching device may constitute a driver circuit and an integrated circuit which includes both a relay switching circuit and a switched circuit, for example a metal-oxide-semiconductor (MOS) driver and a power metal-oxide-semiconductor field-effect-transistor (MOSFET) integrated circuit. This system activates the vehicles lights and wipers whereas the present invention varies the illumination of the vehicle or strobes the vehicles lights to warn oncoming vehicles.

In U.S. Pat. No. 4,843,370, titled Intelligent, Automatic Hazard Light for a Motor Vehicle, invented by Karl F. Milde an intelligent electronic circuit apparatus is disclosed for automatically controlling the hazard warning system (such as tail light) of a motor vehicle so as to assist in preventing accidents. The apparatus includes a switch for selectively connecting the tail light with a voltage source and a control device for automatically closing the switch, thereby connecting the tail light to the voltage source, in response to a condition indicating a hazard to other vehicles in the vicinity. The invention provides means for sensing the driving environment of the motor vehicle and for changing the condition of response in dependence upon the sensed environment. This invention controls the hazard warning system to warn other vehicles of a hazard whereas the present invention controls any number of lighting systems of the vehicle in order to aid in other vehicles being able to see the equipped vehicle at greater distances by increasing the illumination of the lighting systems of said vehicle.

In U.S. Pat. No. 3,316,441, invented by Nallinger differs from the present invention because the present invention describes a complete inclement weather safety system. This system comprises specific safety enhancements to a large number of vehicle lights, resulting in a complete warning system for trailing as well as oncoming vehicles. By comparison, the Nallinger patent fails to claim as comprehensive a total system as does the present invention. The Nallinger patent is specifically designed to increase the effectiveness of turn indicator lights. While it is applicable for this specific but limited use, the patent as a whole constitutes merely a limited aspect of the complete present invention. The present invention includes a system to increase the intensity of illumination by a factor of 15%, during periods of inclement weather, the following variety of lights: marking lights, brake lights, directional signal lights, license plate lights and warning lights. Additionally, the present invention includes a system to cause the either the high or low headlight beam or strobe light to flash at microsecond intervals to create a strobe effect, during periods of inclement weather to warn approaching vehicles of the intended direction the driver intends to turn.

One benefit of the system incorporated in the present invention is its multi functional capability. As such it is much more likely to be installed. If a factory is going to go through the trouble to add new features to the vehicle lighting system, it is more likely to install the present invention which enhances the performance of a variety of lights including: marking lights, brake lights, directional signal lights, license plate lights, warning lights and head lights. Installation of the Nallinger patent will only result in additional installation costs being incurred by the factory, should the factory decide at a later date to incorporate some of the additional features present in the present invention. Additionally, in the instances where the individual decides to incorporate either of these lighting system enhancement systems, they would conclude that the present invention is preferable for many of the same reasons. Installation of the present invention will result in reduced installation costs as well as purchasing costs, by avoiding the need to purchase a number of different systems to duplicate all of the added illumination benefits provided by the present invention. As a result, the average consumer can more readily afford the present invention, thus increasing the likelihood of widespread public usage. The patent by Nallinger is limited in that it does not take advantage of this embodiment present in the Rocca invention.

As previously discussed, the present invention by the present invention provides for multi functional capability. The present invention includes a system to increase the intensity of illumination by a factor of 15%, during periods of inclement weather, the following variety of lights: marking lights, brake lights, directional signal lights, license plate lights and warning lights. As such, the increased benefits provided by this system results in a heightened state of visibility for the vehicle. Therefore, other drivers, whether following or approaching can more easily view the vehicle during periods of inclement weather. Therefore, the present invention represents a safety enhancement to the public and serves their best interests. However, the patent by Nallinger only enhances the illumination of turn indicator lights. If the driver is not in the process of signaling to turn, no additional illumination benefit is incurred. Therefore, the patent is specific only to specific situations and is limited in providing adequate warning to other drivers on a more constant basis. As such, the Nallinger patent is limited in providing for the overall safety of the drivers and any passengers of all vehicles concerned.

Additionally, the present invention includes a system to cause the either the high or low headlight beam or strobe to flash at microsecond intervals to create a strobe effect. As such, the increased benefits provided by this system results in a heightened state of visibility from the perspective of oncoming vehicles. Therefore, other drivers, approaching can more easily view the vehicle during periods of inclement weather knowing which direction the vehicle equipped with the inclement weather safety system in intending to turn. Therefore, the present invention incorporates an additional system which represents a safety enhancement to the public and serves their best interests. However, the patent by Nallinger does not incorporate any such strobe enhancement. As such, the Nallinger patent is limited in providing for the overall safety of the drivers and any passengers of all vehicles concerned. Finally, it would not be obvious to use a DC to DC Converter to increase the voltage level to provide an equivalent function to that of the means used in the Nallinger patent.

U.S. Pat. No. 5,231,373, invented by Freeman, differs from the present invention because the present invention specifically claims a complete inclement weather safety system. This system comprises specific safety enhancements to a large number of vehicle lights, resulting in a complete warning system for trailing as well as oncoming vehicles. By comparison, the Freeman patent fails to claim as comprehensive a total system, in this area, as does the present invention. The Freeman patent is specifically designed to increase the effectiveness of brake lights. While it is applicable for this specific but limited use, the patent as a whole addresses a different issue than does the present invention. The present invention includes a system to increase the intensity of illumination by a factor of 15%, during periods of inclement weather, the following variety of lights: marking lights, brake lights, directional signal lights, license plate lights and warning lights. Additionally, the present invention includes a system to cause either the high or low headlight or strobe to flash at microsecond intervals to create a strobe effect, during periods of inclement weather. knowing which direction the vehicle equipped with the inclement weather safety system is intending to turn. The Freeman patent is designed to vary the intensity of brake lights, depending on the rates of vehicle deceleration. This system requires the use of more sophisticated microelectronics, based around an accelerometer, used to detect deceleration speeds. Clearly, this patent addresses a different issue in toto, than does the present invention which addresses the issue of visibility during periods of inclement weather.

Furthermore, it would not have been obvious to use a moisture sensor as taught by Freeman in conjunction with a vehicle lighting system as disclosed by Nallinger in order that light intensity could have been changed in rainy as well as foggy weather conditions. No prior art reveals a moisture sensor in conjunction with the total weather system embodied in the current invention, wherein the intensity of illumination can be increased by a factor of 15%, which can be increased in response to adverse moisture indication. Such a mechanism provides an entirely different result than that claimed in Freeman.

In U.S. Pat. No. 3,631,391, invented by Eckhard differs from the present invention because the present invention specifically claims a complete inclement weather safety system. This system comprises specific safety enhancements to a large number of vehicle lights, resulting in a complete warning system for trailing as well as oncoming vehicles. By comparison, the Eckhard patent fails to claim as comprehensive a total system, in this area, as does the present invention. The Eckhard patent is specifically designed to provide a lighting system for the exterior of stationary parked cars. While it is applicable for this specific but limited use, the patent as a whole addresses a different issue than does the present invention. The present invention includes a system to increase the intensity of illumination by a factor of 15%, during periods of inclement weather, the following variety of lights: marking lights, brake lights, directional signal lights, license plate lights and warning lights. Additionally, the present invention includes a system to cause either the high or low headlight beam or strobe light to flash at microsecond intervals to create a strobe effect, during periods of inclement weather. Clearly, the Eckhard patent addresses a different issue in toto, than does the present invention which addresses the issue of visibility during periods of inclement weather.

Moreover, it would not have been obvious to include a dashboard indicator representative of exterior lights in a system as disclosed by Nallinger in light of Eckhard in order to allow a driver to determine condition of lights without getting out of the vehicle. The Eckhard patent incorporates a symbol of the car on the dashboard with indicator lights symbolizing which exterior lights are on. The present invention, on the other hand, provides for a much simpler embodiment of an indicator light, symbolizing merely whether the inclement weather system is in an on or off mode of operation. This indicator light would be on the dashboard if the system were installed at the factory. However, the present invention provides for the contingency that an individual would want to install the system as an add on themselves. In that case, the indicator light would be such that it would be visible from under the dashboard. There would be no need to be hampered in the installation process by having to remove parts of the dashboard, as would have to be done with the Eckhard patent indicator lights. Thus, installation of the Eckhard patent by the consumer, if that is even a contingency, results in a complicated installment process being incurred by the consumer, because he must incorporate the indicator lights within the car dashboard. As such, there is a decreasing likelihood of widespread public adaptation of the Eckhard patent as compared to the present invention.

In U.S. Pat. No. 3,553,644, invented by Elmer differs from the present invention because the present invention specifically claims a complete inclement weather safety system. This system comprises specific safety enhancements to a large number of vehicle lights, resulting in a complete warning system for trailing as well as oncoming vehicles. By comparison, the Elmer patent fails to claim as comprehensive a total system as does the present invention. The Elmer patent is specifically designed to increase the effectiveness of backup lights. While it is applicable for this specific but limited use, the patent as a whole constitutes merely a limited aspect of the complete present invention. The present invention includes a system to increase the intensity of illumination by a factor of 15%, during periods of inclement weather, the following variety of lights: marking lights, brake lights, directional signal lights, license plate lights and warning lights.

One benefit of the system incorporated in the present invention is its multi functional capability. As such it is much more likely to be installed. If a factory is going to go through the trouble to add new features to the vehicle lighting system, it is more likely to install the present invention which enhances the performance of a variety of lights including: marking lights, brake lights, directional signal lights, license plate lights and warning lights. Installation of the Elmer patent will only result in additional installation costs being incurred by the factory, should the factory decide at a later date to incorporate some of the additional features present in the present invention. Additionally, in the instances where the individual decides to incorporate either of these lighting system enhancement systems, they would conclude that the present invention is preferable for many of the same reasons. Installation of the present invention will result in reduced installation costs as well as purchasing costs, by avoiding the need to purchase a number of different systems to duplicate all of the added illumination benefits provided by the present invention. As a result, the average consumer can more readily afford the present invention, thus increasing the likelihood of widespread public usage. The patent by Elmer is limited in that it does not take advantage of this embodiment present in the present invention.

As previously discussed, the present invention provides for multi functional capability. The present invention includes a system to increase the intensity of illumination by a factor of 15%, during periods of inclement weather, the following variety of lights: marking lights, brake lights, directional signal lights, license plate lights and warning lights. As such, the increased benefits provided by this system results in a heightened state of visibility for the vehicle. Therefore, other drivers, whether following or approaching can more easily view the vehicle during periods of inclement weather. Therefore, the present invention represents a safety enhancement to the public and serves their best interests. However, the patent by Elmer only enhances the illumination of backup lights. As far as warning oncoming vehicles are concerned, no additional illumination benefit is incurred. Therefore, the patent is specific only to specific situations and is limited in providing adequate warning to oncoming drivers. As such, the Elmer patent is limited in providing for the overall safety of the drivers and any passengers of all vehicles concerned.

Additionally, it would not have been obvious to flash vehicle headlights in a system as disclosed by Nallinger, Freeman, and Eckhard in order to indicate the hazardous weather condition to other drivers, nor would it have been obvious to flash the front versus the rear lights in light of Elmer. The present invention includes a system to cause the either the high or low headlight beam or strobe light to flash at microsecond intervals to create a strobe effect. As such, the increased benefits provided by this system results in a heightened state of visibility from the perspective of oncoming vehicles. Therefore, other drivers, approaching can more easily view the vehicle during periods of inclement weather. The Elmer patent provides merely for flashing lights, which are flashed periodically, but fails to provide for the flashing at microsecond intervals to create a strobe effect indicating the direction the vehicle will turn. The strobe effect incorporated in the present invention is more effective at providing a warning signal to other drivers than a mere flashing light. Therefore, the present invention incorporates an additional system which represents a safety enhancement to the public and serves their best interests. However, the patent by Elmer does not incorporate any such strobe enhancement. As such, the Nallinger patent is limited in providing for the overall safety of the drivers and any passengers of all vehicles concerned.

Numerous innovations for an inclement weather safety system have been provided in the prior art that are adapted to be used. Even though these innovations may be suitable for the specific individual purposes to which they address, they would not be suitable for the purposes of the present invention as heretofore described.

SUMMARY OF THE INVENTION

None of the art known to us at the time of filing this application for patent teach or suggest a system that will effect the headlights and all other exterior lights on the vehicle.

It is one object of the present invention to provide a system that will increase the illumination of the lights of a vehicle up to 15%. The added illumination will allow other vehicles approaching in all directions early or faster detection of the location of the vehicle with the safety system.

It is-another object of the present invention to alert an approaching vehicle of the intentions of the vehicle with the inclement weather safety system by flashing the high or low headlight beam or strobe light at high speed.

Still another object of the present invention is to warn drivers approaching your vehicle that you are near them when the visibility is poor. For example when the weather is foggy or during a heavy rain fall or when the snow creates less then desirable visibility.

Accordingly, the present invention is a device for a motor vehicle. The design of the system will incorporate a switch called the IWS (Inclement Weather Safety System) Switch and an IWS Indicator Light which is located in the dashboard instrument panel. When the system is on, the IWS Indicator will be illuminated. When the system is off, the IWS Indicator will be extinguished.

The IWS system is activated when the ignition system, the IWS Switch, the humidity sensitivity/climate control switch and the vehicle lights or fog lights are on. The system is triggered when the humidity sensitivity/climate control switch senses moisture. The flashing of the high or low headlight beam or strobe light is triggered when the directional signal is operated.

If the left turn directional signal is activated, the left side seal beam—high beam or low beam or strobe light filament will flash at a microsecond speed. This flash will occur so fast that an approaching vehicle in inclement weather will know the intentions of the vehicle traveling toward him. The system will operate the right side headlight when the right turn directional signal is activated in the same manner.

The second part of the IWS system will effect the parking, marking, directional, warning, license plate and brake lights. When the inclement weather safety system is switched on, and is triggered, the voltage to the parking, directional, warning, license plate and brake lights will be increased. This in turn will increase the illumination by approximately 15%. The added illumination will allow second vehicles approaching in all directions early or faster detection of the location of the first vehicle that has the IWS system.

It must be noted the inclement weather safety system is designed as a fail safe system. If the system malfunctions or cannot be activated, the normal operation of the vehicle lighting system will resume at all times and in all weather conditions.

The novel features which are considered characteristic for the invention are set forth in the appended claims. The invention itself, however, both as to its construction and its method of operation, together with additional objects and advantages thereof, will be best understood from the following description of the specific embodiments when read and understood in connection with the accompanying drawing.

BRIEF LIST OF REFERENCE NUMERALS UTILIZED IN THE DRAWING

10—automobile battery 10
12—motor vehicle ignition switch 12
14—main lamp switch 14
16—inclement weather safety system switch 16
18—inclement weather safety system indication 18
20—humidity sensitivity/climate control switch 20
22—inclement weather safety system control unit 22
24—motor vehicle turn directional signal switch 24
26—left headlight or fog light 26
28—right headlight or fog light 28
30—Direct Current (DC) to Direct Current (DC) converter 30
32—marking, brake, directional, license plate and warning lights 32

DETAILED LIST OF REFERENCE NUMERALS UTILIZED IN THE DRAWING

10—automobile battery 110 supplies voltage to the left headlight or fog and/or strobe light 26, right headlight or fog and/or strobe light 28, marking, brake, directional, license plate and warning lights 32 and the inclement weather safety system control unit 22

12—motor vehicle ignition switch 12 allows the automobile battery 10 to supply the needed voltage to the left headlight or fog and/or strobe light 26, right headlight or fog and/or strobe light 28, marking, brake, directional, license plate and warning lights 32 via the inclement weather safety system control unit 22

14—main lamp switch 14 turns power on to the inclement weather safety system switch 16

16—inclement weather safety system switch 16 turns on the inclement weather safety system control unit 22

18—inclement weather safety system indication 13 is located in the dashboard if the motor vehicle manufacture installs the system or under the dashboard if the motor vehicle owner installs the system and indicates to the driver of the vehicle that the inclement weather safety system is on and when the system is triggered.

20—humidity sensitivity/climate control switch 20 detects when there is inclement weather such as fog or heavy rain or snow.

22—inclement weather safety system control unit 22 is activated when the directional switch 24 is in the right or left turn position allowing the left headlight or fog and/or strobe light 26 or right headlight or fog and/or strobe light 28 to flash at microsecond speed to indicate to other motor vehicles driving toward you which direction you intend to turn. In addition, the inclement weather safety system control unit 22 supplies voltage to the DC to DC converter 30 which in turn increases the voltage to the marking, brake, directional, license plate and warning lights 32 which is activated when the system is triggered.

24—motor vehicle turn directional switch 24 is moved up or down to turn on the right or left directional signals respectively of the motor vehicle. This switch will also provide a signal to the inclement weather safety system control unit 22 which will flash either the left headlight or fog and/or strobe light 26 or the right headlight or fog and/or strobe light 28 at a microsecond speed when inclement water safety system control unit 22 is triggered.

26—left headlight or fog and/or strobe light 26 flashes at a microsecond speed when the system is activated/triggered and the directional signal switch is in the left turn position.

28—right headlight or fog and/or strobe light 28 flashes at a microsecond speed when the system is activated/triggered and the directional signal switch 24 is in the right turn position.

30—Direct Current (DC) to Direct Current (DC) converter, draws voltage from motor vehicle battery by changing DC voltage to alternating current (AC) voltage back to Direct Current (DC) voltage increasing voltage by approximately 15% in addition, provides filtering for interference from electrical noise.

32—marking, brake, directional, license plate and warning lights surrounding the motor vehicle which increases in illumination when the system is activated and triggered.

BRIEF DESCRIPTION OF THE PREFERRED EMBODIMENT

DETAILED DESCRIPTION OF THE PREFERRED EMBODIMENT

Figure 1:
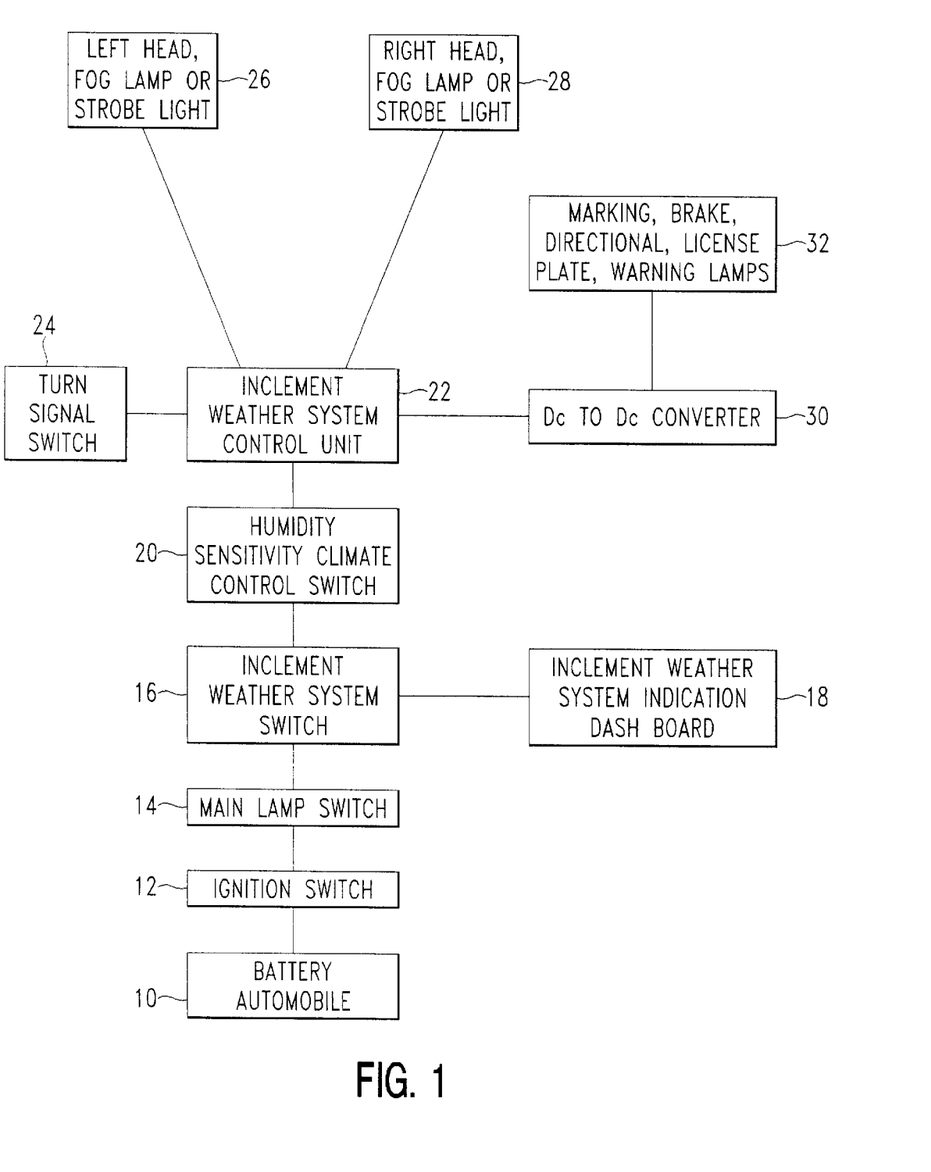
FIG. 1 is a flow diagram of the inclement weather safety system installed by the motor vehicle manufacturer using both the head light or strobe light indications and the secondary, step-up voltage light indications.

Firstly, referring to FIG. 1, which is a flow diagram of the inclement weather safety system using both the head light indications and the secondary, step up voltage light indications, exhibiting the following features: automobile battery 10 supplies voltage to the left headlight or fog light or strobe light 26, right headlight or fog light or strobe light 28, marking, brake, directional, license plate and warning lights 32 and the inclement weather safety system control unit 22; motor vehicle ignition switch 12 allows the automobile battery 10 to supply the needed voltage to the left headlight or fog light or strobe light 26, right headlight or fog light or strobe light 28, marking, brake, directional, license plate and warning lights 32 only when the inclement weather safety system control unit 22; main lamp switch 14 turns power on to the inclement weather safety system control unit 22; inclement weather safety system switch 16 turns on the inclement weather safety system control unit 22; inclement weather safety system indication 18 is located in the dashboard if the motor vehicle manufacture installs the system or under the dashboard if the motor vehicle owner installs the system and indicates to the driver of the vehicle that the inclement weather safety system switch 16 is on; humidity sensitivity/climate control switch 20 detects when there is inclement weather such as fog or heavy rain or snow; when detected, the indication in or under the dashboard will increase in illumination; inclement weather safety system control unit 22 will activate the left headlight or fog and/or strobe light 26 or right headlight or fog and/or strobe light 28 to flash at microsecond speed when directional switch 24 is placed in the right or left turn position; when the humidity sensitivity/climate control switch is closed voltage to the (DC) to (DC) converter 30 will increase voltage to the marking, brake, directional, license plate and warning lights 32 allowing the illumination to be increased by approximately 15%

Figure 2:
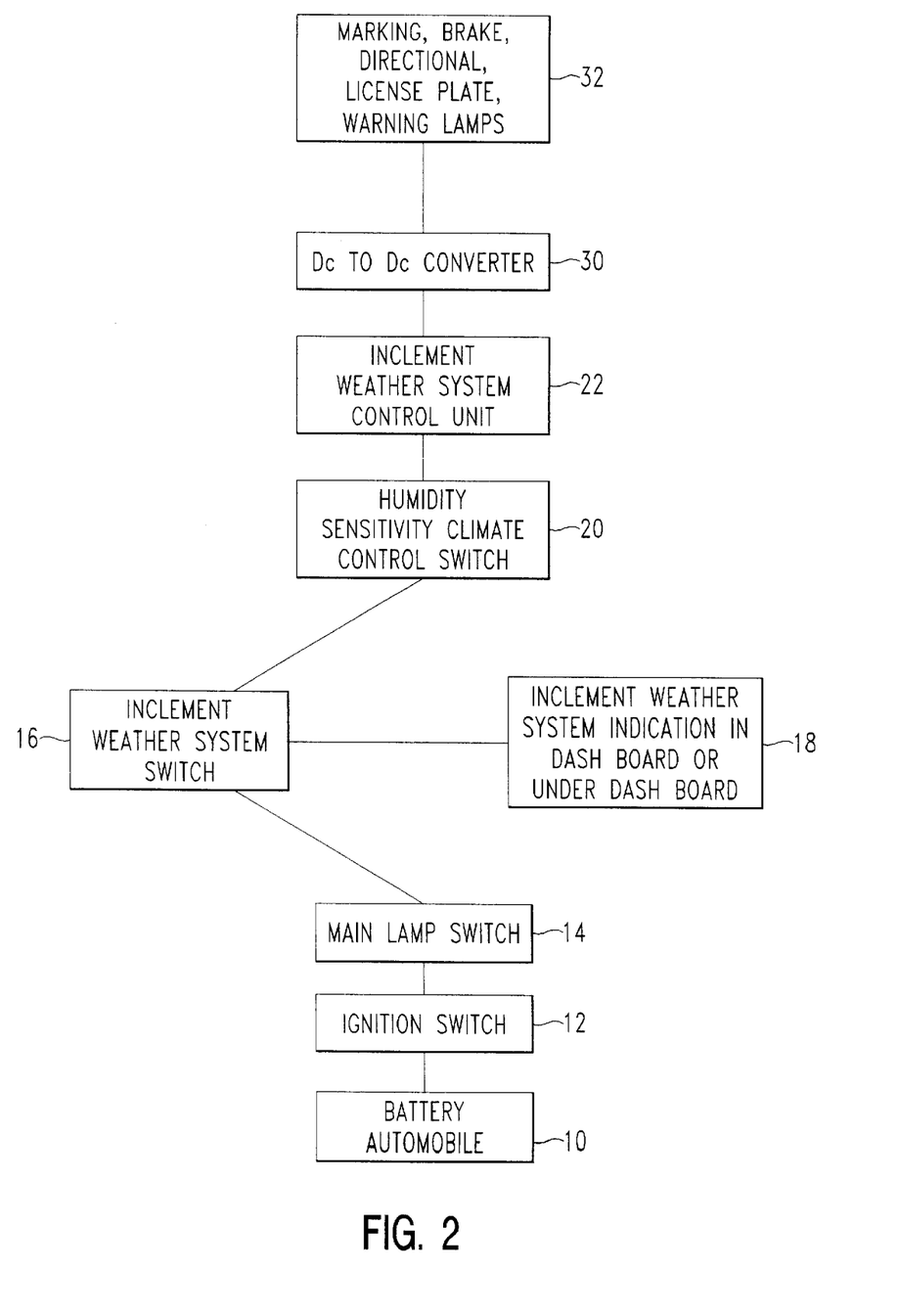
FIG. 2 is a flow diagram of the inclement weather safety system using only the marking lights.

Now referring to FIG. 2 which is a flow diagram of the inclement weather safety system using only the marking lights exhibiting the following features: automobile battery 10 supplies voltage to marking, brake, directional, license plate and warning lights 32 and the inclement weather safety system control unit 22; motor vehicle ignition switch 12 allows the automobile battery 10 to supply the needed voltage to marking, brake, directional, license plate and warning lights 32 only when the inclement weather safety system control unit 22; main lamp switch 14 turns power on to the inclement weather safety system control unit 22; inclement weather safety system switch 16 turns on the inclement weather safety system control unit 22; inclement weather safety system indication 18 is located in the dashboard if the motor vehicle manufacture installs the system or under the dashboard if the motor vehicle owner installs the system and indicates to the driver of the vehicle that the inclement weather safety system control unit 22 is on; humidity sensitivity/climate control switch 20 detects when there is inclement weather such as fog or heavy rain or snow; this detection will increase the illumination of the inclement weather safety system indicator; inclement weather safety system control unit 22 provides voltage to the (DC) to (DC) converter 30 will increase voltage to the marking, brake, directional, license plate and warning lights 32 allowing the illumination to be increased by approximately 15%.

Figure 3:
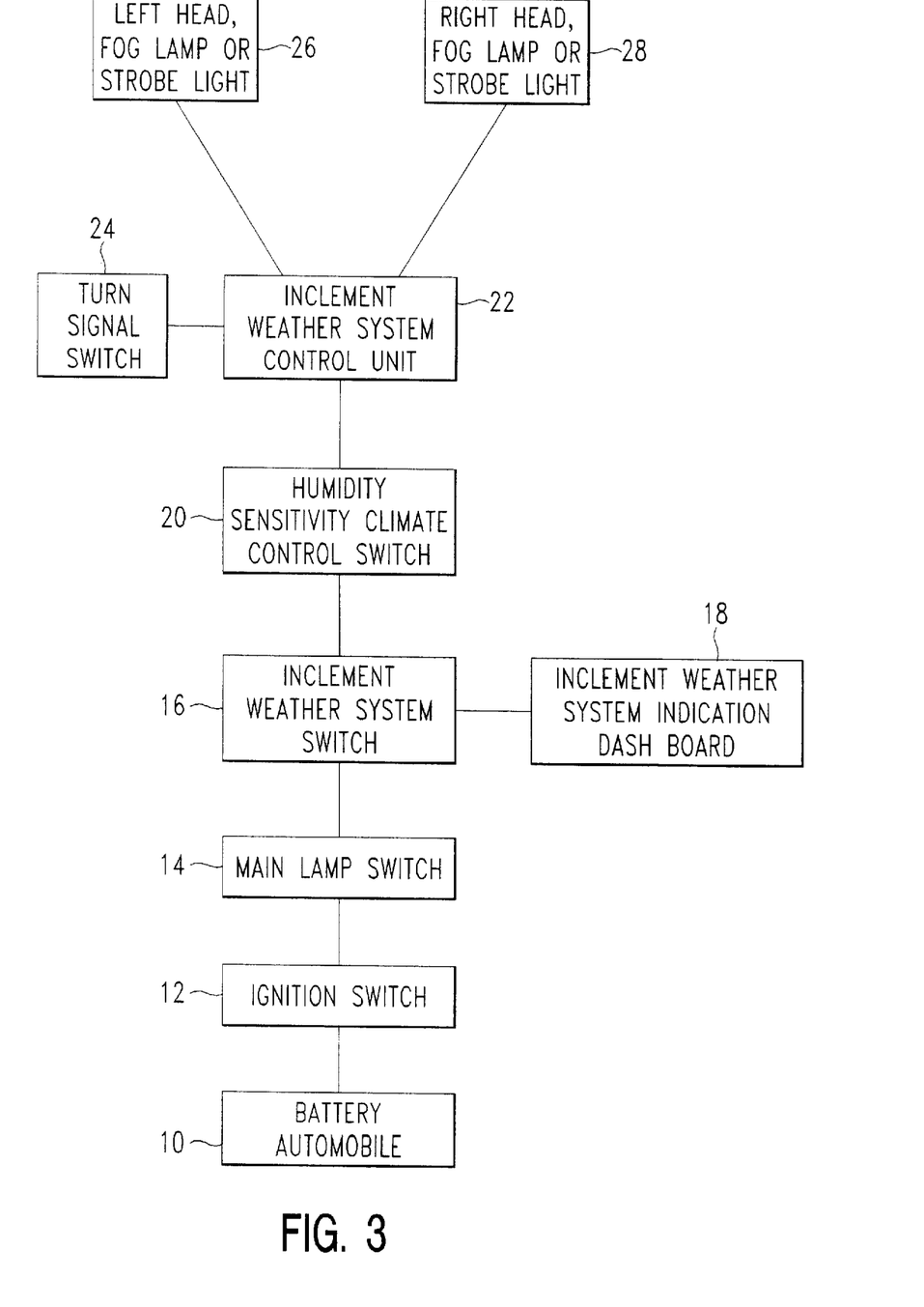
FIG. 3 is a flow diagram of the inclement weather safety system using only the headlight or strobe light indications.

Now, referring to FIG. 3, which is a flow diagram of the inclement weather safety system using only the head light or strobe light indications exhibiting the following features: automobile battery 10 supplies voltage to the left headlight or fog light or strobe light 26, right headlight or fog light or strobe light 28, and the inclement weather safety system control unit 22; motor vehicle ignition switch 12 allows the automobile battery 10 to supply the needed voltage to the left headlight or fog light or strobe light 26, right headlight or fog light or strobe light 28; main lamp switch 14 turns power on to the inclement weather safety system switch 16; inclement weather safety system switch 16 turns on the inclement weather safety system control unit 22; inclement weather safety system indication 18 is located in the dashboard if the motor vehicle manufacture installs the system. or under the dashboard if the motor vehicle owner installs the system and indicates to the driver of the vehicle that the inclement weather safety system control unit 22 is on; humidity. sensitivity/climate control switch 20 detects when there is inclement weather such as fog or heavy rain or snow; this detection will increase the illumination of the IWS indicator; inclement weather safety system control unit 22 will activate the left headlight or fog and/or strobe light 26 or right headlight or fog and/or strobe light 28 to flash at microsecond speed when directional switch 24 is placed in the right or left turn position.

Figure 4:
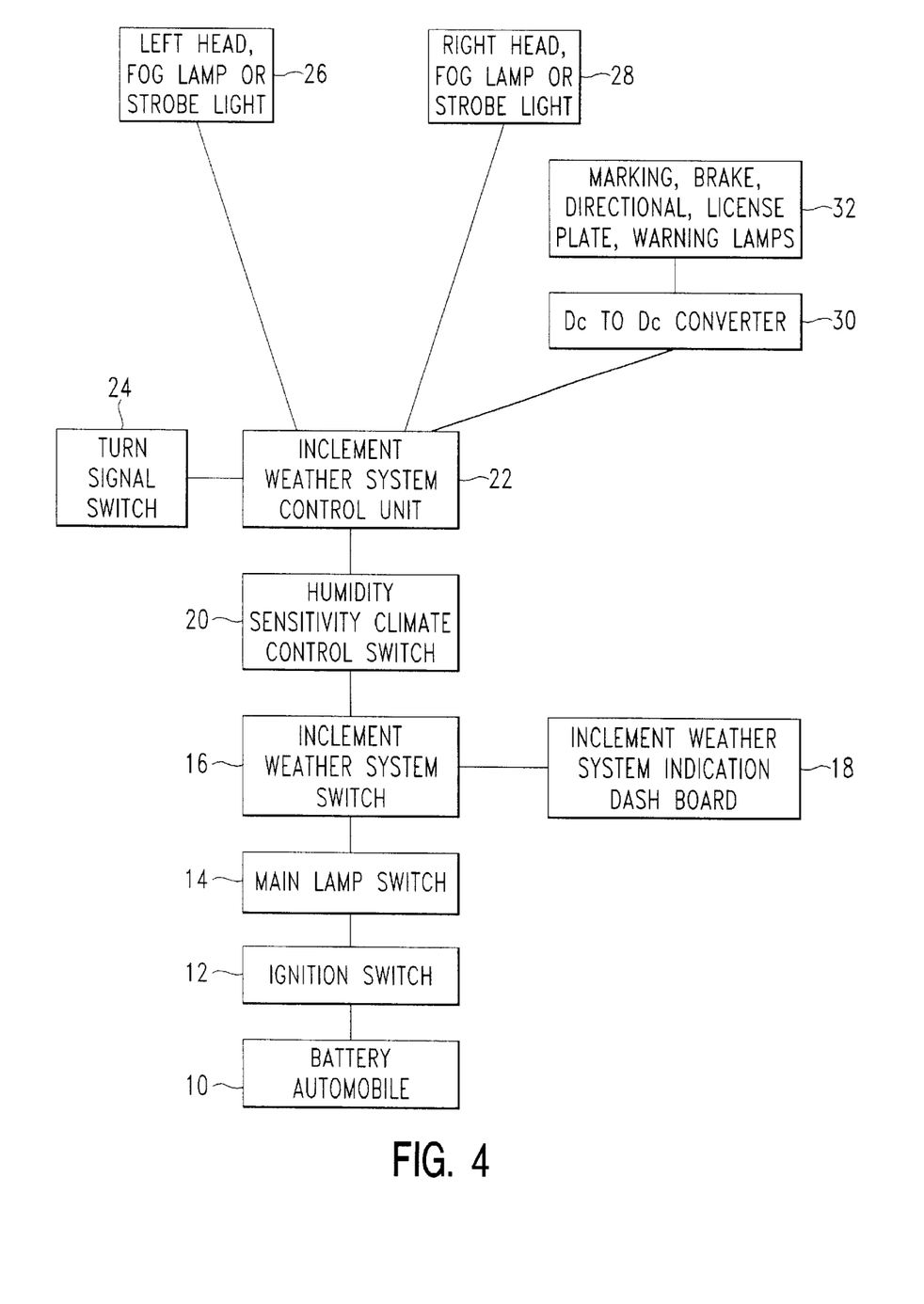
FIG. 4 is a flow diagram of the inclement weather safety system in a kit form installed by the motor vehicle owner using both the headlight indications and the secondary, step-up voltage light indications.

Lastly, referring to FIG. 4, which is a flow diagram of the inclement weather safety system in a kit form installed by the motor vehicle owner using both the head light indications and the secondary, step up voltage light indications exhibiting the following features: automobile battery 10 supplies voltage to the left headlight or fog light or strobe light 26, right headlight or fog light or strobe light 28, marking, brake, directional, license plate and warning lights 32 and the inclement weather safety system control unit 22; motor vehicle ignition switch 12 allows the automobile battery 10 to supply the needed voltage to the left headlight or fog light or strobe light 26, right headlight or fog light or strobe light 28, marking, brake, directional, license plate and warning lights 32 only when the inclement weather safety system control unit 22; main lamp switch 14 turns power on to the inclement weather safety system control unit 22; inclement weather safety system switch 16 provides voltage to the inclement weather safety system control unit 22; inclement weather safety system indication 18 is located under the dashboard as owner installs the system and indicates to the driver of the vehicle that the inclement weather safety system control unit 22 is on; humidity sensitivity/climate control switch 20 detects when there is inclement weather such as fog or heavy rain or snow; this detection will increase the illumination of the IWS indicators; inclement; weather safety system control unit 22 will activate the left headlight or fog and/or strobe light 26 or right headlight or fog and/or strobe light 28 to flash at microsecond speed when directional switch 24 is placed in the right or left turn position; when the humidity sensitivity/ climate control switch provides voltage to the (DC) to (DC) converter 30 will increase voltage to the marking, brake, directional, license plate and warning lights 32 allowing the illumination to be increased by approximately 15%.

It will be understood that each of the elements described above, or two or more together, may also find a useful application in other types of constructions differing from the type described above.

While the invention has been illustrated and described as embodied in an inclement weather safety system, it is not intended to be limited to the details shown, since it will be understood that various omissions, modifications, substitutions and changes in the forms and details of the device illustrated and in its operation can be made by those skilled in the art without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed as new and desired to be protected by letters patent is set forth in the appended claims:

What is claimed is:

1. An inclement weather safety system having left and right strobe lights, an inclement weather system switch, an inclement weather system indication, a humidity sensitivity/ climate control switch, and a Direct Current (DC) to Direct Current (DC) converter, for a motor vehicle having an ignition switch, a main lamp switch, turn directional signal switch, left and right headlights and fog lights, and marking, brake, directional, license plate and warning lights for operation by a driver, comprising:

A) a power means; and

B) an inclement weather safety system control unit (22) which is electronically connected to a motor vehicle turn directional signal switch (24) and to a Direct Current (DC) to Direct Current (DC) converter 30 which is electronically connected to marking, brake, directional, license plate and warning lights (32), the inclement weather system control unit (22) also being electronically connected to a humidity sensitivity/ climate control switch (20) which is electronically connected to an inclement weather safety system switch (16) which is electronically connected to an inclement weather safety system indication (18), the inclement weather safety system switch (16) also being electronically connected to a main lamp switch (14) which is electronically connected to a motor vehicle ignition switch (12) which is electronically connected to the power means;

when the motor vehicle ignition switch (12) is activated by the driver, and the main lamp switch (14) is also activated by the driver the main lamp switch provides voltage to the inclement weather system switch (16) concurrently activated, the inclement weather safety system indication (18) also concurrently activates, the humidity sensitivity/climate control switch (20) activates the inclement weather safety system control unit (22) which occurs when inclement weather including fog, heavy rain or snow, are detected, the inclement weather safety system control unit (22) activates the Direct Current (DC) to Direct Current (DC) converter (30) which is electronically connected to marking, brake, directional, license plate and warning lights (32) to increase their illumination, the turn directional signal switch (24) is electronically connected to the inclement weather safety system control unit (22) which flashes at microsecond speed a light selected from a group of lights consisting of left headlight, fog light, strobe light (26), right headlight, fog light, strobe light (28) which is determined by the position of the turn directional signal switch (24).

2. A motor vehicle inclement weather safety system comprising:

A) power means:

B) an inclement weather safety system features; automobile battery (10) which is electronically connected to an ignition switch (12) which is electronically connected to a main lamp switch (14) which is electronicaly connected to an inclement weather system switch (16) which is electronically connected to both an inclement weather system indication (18) and a humidity sensitivity/climate control switch (20) which is electronically connected to an inclement weather system control unit (22) which is concurrently electronically connected to a Dc to Dc converter (30) which is electronically connected to marking, brake, directional, license plate, warning lamps (32); the inclement weather system control unit (22) is electronically connected to the right head or fog lamp or strobe light (28); the inclement weather system control unit (22) which is also electronically connected to the left head or fog lamp or strobe light (26); the inclement weather system control unit (22) which is electronically connected to the turn signal switch (24):

C) whereby when the motor vehicle ignition switch (12) is activated and the main lamp switch (14) is activated and the inclement weather system switch (16) is activated and when inclement weather conditions exist, the humidity sensitivity climate control switch (20) detects said weather conditions and is activated and in turn activates the inclement weather system control unit (22) which increases the illumination of the inclement weather safety system indication (18) located on the dashboard and concurrently increases the illumination of the marking, brake, directional, license plate and warning lights (32); the inclement weather safety system control unit (22) also intensifies brightness of at least one head light or fog light or strobe light which flashes at a microsecond speed which is triggered by the directional signal switch (24).

3. A motor vehicle inclement weather safety system comprising:
A) power means:
B) an inclement weather safety system having an ignition switch, a main lamp switch, an inclement weather system switch, an inclement weather system indication, a humidity sensitivity/climate control switch, an inclement weather system control unit, and "a DC to DC converter, features an automobile battery which is electronically connected to an ignition switch which is electronically connected to a main lamp switch which is electronically connected to an inclement weather system switch which is electronically connected to both an inclement weather system indication on a dashboard and to a humidity sensitivity/climate control switch which is electronically connected to an inclement weather system control unit which is concurrently electronically connected to a DC to DC converter which is electronically connected to marking, brake, directional, license plate and warning lamps; the inclement weather system control unit is also electronically connected to the right head or fog lamp or strobe light; the inclement weather system control unit is also electronically connected to the left head or fog lamp or strobe light; the inclement weather system control unit is also electronically connected to the turn signal switch:
C) whereby when the motor vehicle ignition switch is activated and the main lamp switch is activated and the inclement weather system switch is activated and when inclement weather conditions exist, the humidity sensitivity/climate control switch detects said weather conditions and is activated and in turn activates the inclement weather system control unit which increases the illumination of the inclement weather safety system indication located on the dashboard and concurrently increases the illumination of the marking, brake, directional, license plate and warning lights; the inclement weather safety system control unit also intensifies brightness of at least one head light or fog light or strobe light which flashes at a microsecond speed which is triggered by the directional signal switch.

4. A motor vehicle inclement weather safety system comprising:
A) power means:
B) an inclement weather safety system having an ignition switch, a main lamp switch, an inclement weather system switch, an inclement weather system indication, a humidity sensitivity/climate control switch, an inclement weather system control unit, and "a DC to DC converter, features automobile battery (10) which is electronically connected to an ignition switch (12) which is electronically connected to a main lamp switch (14) which is electronically connected to an inclement weather system switch (16) which is electronically connected to both an inclement weather system indication (18) and to a humidity sensitivity/climate control switch (20) which is electronically connected to an inclement weather system control unit (22) which is concurrently electronically connected to a DC to DC converter (30) which is electronically connected to marking, brake, directional, license plate, warning lamps (32):

C) whereby when the motor vehicle ignition switch (12) is activated and the main lamp switch (14) is activated and the inclement weather system switch (16) is activated and when inclement weather conditions exist, the humidity sensitivity/climate control switch (20) detects said weather conditions and is activated and in turn activates the inclement weather system control unit (22) which increases the illumination of the inclement weather safety system indication (18) located on the dashboard and concurrently increases the illumination of the marking, brake, directional, license plate and warning lights (32).

5. A motor vehicle inclement weather safety system comprising:
A) power means;
B) an inclement weather safety system having an ignition switch, a main lamp switch, an inclement weather system switch, an inclement weather system indication, a humidity sensitivity/climate control switch, an inclement weather system control unit, and "a DC to DC converter, features automobile battery which is electronically connected to an ignition switch which is electronically connected to a main lamp switch which is electronically connected to an inclement weather system switch which is electronically connected to both an inclement weather system indication on a dashboard and a humidity sensitivity climate control switch which is electronically connected to a inclement weather system control unit which is electronically connected to a DC to DC converter which is electronically connected to marking, brake, directional, license plate and warning lamps:
C) whereby when the motor vehicle ignition switch is activated and the main lamp switch is activated and the inclement weather system switch is activated and when inclement weather conditions exist, the humidity sensitivity/climate control switch detects said weather conditions and is activated and in turn activates the inclement weather system control unit which increases the illumination of the inclement weather safety system indication located on the dashboard and concurrently increases the illumination of the marking, brake, directional, license plate and warning lights.

6. In a vehicle having a turn directional signal and a mechanism for activating the signal, a strobe light, and apparatus for activating the strobe light when the turn directional signal is activated.

7. A vehicle according to claim 6, wherein the strobe light is a vehicle headlight.

8. A vehicle according to claim 6, and that has a humidity sensor, and an arrangement preventing the apparatus from activating the strobe light when the humidity is below a predetermined level.

9. A vehicle according to claim 6, and the vehicle has other lights that are brightened when the humidity is above a predetermined level.

10. A vehicle according to claim 9, wherein the other lights comprise marking lights.

11. A vehicle according to claim 9, wherein the other lights comprise brake lights.

12. A vehicle according to claim 9, wherein the other lights comprise directional lights.

13. A vehicle according to claim 9, wherein the other lights comprise license plate lights.

14. A vehicle according to claim 9, wherein the other lights comprise warning lights.

15. A vehicle according to claim 8, wherein an inclement weather safety system indication is located on a dash board, and circuitry for activating the indication when the humidity sensor senses humidity above a predetermined level.

16. A vehicle according to claim 9, wherein an inclement weather safety system indication is located on a dash board, and circuitry for activating the indication when the humidity sensor senses humidity above a predetermined level.

17. A vehicle according to claim 9, wherein the other lights are brightened using a DC to DC converter.

18. A vehicle according to claim 17, wherein the DC to DC converter converts a direct current at one voltage level to an alternating current and then to a higher voltage level direct current.

19. A vehicle according to claim 18, wherein the higher voltage level direct current increases illumination of the lights by fifteen percent.

20. For use in a vehicle having a turn directional signal, a mechanism for activating the signal, and a headlight, an inclement weather safety system comprising means for strobing the headlight, apparatus for activating the strobing means when the turn directional signal is activated, a humidity sensor, and an arrangement for preventing the apparatus from activating the strobing means when the humidity is below a predetermined level.

* * * * *